United States Patent
Kishigami et al.

(10) Patent No.: US 10,284,388 B2
(45) Date of Patent: May 7, 2019

(54) COMMUNICATION SYSTEM

(71) Applicant: DENSO CORPORATION, Kariya, Aichi-pref. (JP)

(72) Inventors: Tomohisa Kishigami, Kariya (JP); Shigeki Ohtsuka, Kariya (JP); Nobuaki Matsudaira, Kariya (JP); Hironobu Akita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/744,103

(22) PCT Filed: Jun. 13, 2016

(86) PCT No.: PCT/JP2016/002848
§ 371 (c)(1),
(2) Date: Jan. 12, 2018

(87) PCT Pub. No.: WO2017/013829
PCT Pub. Date: Jan. 26, 2017

(65) Prior Publication Data
US 2018/0205572 A1    Jul. 19, 2018

(30) Foreign Application Priority Data

Jul. 17, 2015  (JP) ................................. 2015-142928

(51) Int. Cl.
*H04L 12/40* (2006.01)
*H04L 25/02* (2006.01)
*H04L 25/03* (2006.01)

(52) U.S. Cl.
CPC ........ *H04L 12/40169* (2013.01); *H04L 25/02* (2013.01); *H04L 25/0272* (2013.01);
(Continued)

(58) Field of Classification Search
CPC ..... H04L 12/40169; H04L 2012/40215; H04L 2012/40273; H04L 25/02; H04L 25/03; H04L 25/0272
See application file for complete search history.

(56) References Cited

U.S. PATENT DOCUMENTS 5,588,002 A * 12/1996 Kawanishi .......... H04L 12/4625
370/462
2003/0076221 A1* 4/2003 Akiyama .......... H04L 12/40182
340/12.32
(Continued)

*Primary Examiner* — Rina C Pancholi
(74) *Attorney, Agent, or Firm* — Posz Law Group, PLC

(57) ABSTRACT

A communication system includes a transmission path and multiple nodes. At least one of the multiple nodes includes a second communication portion and a control portion in addition to a first communication portion. When the control portion performs a high speed communication, the control portion shifts the first communication portion included in each of the remaining multiple nodes to a sleep mode. The second communication portion performs a differential communication at a higher speed than the first communication portion using a differential signal. In the differential signal, a maximum of a potential difference between the pair of communication lines is equal to or less than a recessive threshold value, and a minimum of the potential difference between the pair of communication lines is a negative voltage value that has a polarity opposite to the recessive threshold value of the first communication portion.

6 Claims, 8 Drawing Sheets

(52) U.S. Cl.
CPC .... *H04L 25/03* (2013.01); *H04L 2012/40215* (2013.01); *H04L 2012/40273* (2013.01)

(56) References Cited

U.S. PATENT DOCUMENTS

| | | | |
|---|---|---|---|
| 2008/0116992 A1* | 5/2008 | Kishigami | H04L 1/24 333/101 |
| 2010/0085482 A1* | 4/2010 | Toba | G09G 5/006 348/554 |
| 2012/0051241 A1* | 3/2012 | Mori | H04L 12/12 370/252 |
| 2012/0194292 A1* | 8/2012 | Lewis | H04L 25/0266 333/100 |
| 2013/0294540 A1* | 11/2013 | Hell | H04L 25/0272 375/295 |
| 2014/0071995 A1* | 3/2014 | Hartwich | H04L 1/0002 370/468 |
| 2015/0222455 A1* | 8/2015 | Ohtsuka | H04L 25/0272 375/219 |

* cited by examiner

COMMUNICATION SYSTEM

CROSS REFERENCE TO RELATED APPLICATIONS

This application is a U.S. national stage application of International Application No. PCT/JP2016/002848 filed on Jun. 13, 2016 and is based on Japanese Patent Application No. 2015-142928 filed on Jul. 17, 2015, the disclosures of which are incorporated herein by reference.

TECHNICAL FIELD

The present disclosure relates to a communication system that performs a differential communication among multiple nodes connected to a common transmission path via a bus connection.

BACKGROUND

As a communication system (in-vehicle network) that is attached to a vehicle and performs a differential communication, CAN (Controller Area Network, a registered trademark) whose maximum communication speed is approximately 1 Mbps is known.

CAN-FD (CAN with Flexible Data-Rate, a registered trademark), which is capable of performing higher speed communication than CAN, is also known. Maximum communication speed of CAN-FD is approximately 8 Mbps.

In a frame configuration of CAN-FD, areas of data and CRC (Cyclic Redundancy Check) are accelerated and the remaining areas are the same as CAN. With this configuration, CAN-FD is capable of performing the differential communication at higher speed than CAN with a common transmission path used.

Related to the vehicle, further acceleration of the in-vehicle network is required due to an increase of attached electronic control apparatuses (ECU: Electronic Control Unit).

As an example of communication system that is capable of performing high speed communication, Ethernet (Ethernet: a registered trademark) is widely known. To meet the above-described requirement, Ethernet that has communication speed of approximately 100 Mbps may be employed in the in-vehicle network.

Ethernet is different in a characteristic of physical layer and protocol from CAN or CAN-FD. In a vehicle that has constructed network under CAN or CAN-FD, in order to construct Ethernet for high speed communication in addition, an exclusive communication line needs to be wired.

Alternatively, a communication technique transmitting a first signal (voice data) as an in-phase signal, and a clock signal synchronized with the first signal as a differential signal, is proposed. In this configuration, the communication is made on the transmission path configured by a pair of the communication lines (for example, see Patent Literature 1).

PATENT LITERATURE

Patent Literature 1: Japanese Patent No. 4645717

SUMMARY

The above-described Patent Literature 1 proposes a multiplex communication technique that is capable of recovering an analog voice signal with a high precision by the transmission apparatus. This configuration performs multiplex transmission that transmits voice data and a clock signal synchronized with the voice data using a common transmission path.

With the multiplex communication technique applied to an in-vehicle network, it is considered that a vehicle in which the network of CAN or CAN-FD is constructed may perform a high speed communication using the network and the common transmission path.

For example, a synchronization signal for a high speed communication is overlapped on a pair of communication lines for a differential communication of CAN, CAN-FD, or the like. With this configuration, an existing differential communication of CAN, CAN-FD, or the like and the high speed communication using the synchronization signal are capable of being performed using the common transmission path.

The communication technique proposed in Patent Literature 1 is the technique that transmits two kinds of signals, the differential signal and the synchronization signal. In this configuration, in each of communication terminals connected to the network, a reception portion that is capable of separating the signals and restoring the signals needs to be provided. Thus, configuration of the communication terminal may be complicated.

In the above-described configuration, when each of the communication terminals is connected, via the transmission path, to one another in one to one manner, the multiplex communication can be performed between the communication terminals. When each of the communication terminals is connected to one another via a bus connection, such as CAN or CAN-FD, a proper communication may not be performed.

In the communication system employing the bus connection, the multiplex communication may be performed at multiple different communication speeds. In this case, in each communication terminal, a transceiver for the low speed communication of CAN or CAN-FD and a transceiver for the high speed communication are connected to the transmission path.

When the transceiver for the high speed communication starts performing the high speed communication and an electric potential of the transmission path changes, the transceiver for the low speed communication of CAN, CAN-FD, or the like incorrectly determines a reception of signal. In this case, the transceiver for the low speed communication starts performing the low speed communication. Thus, the communication system may fail to perform the proper communication.

In view of the foregoing difficulties, it is an object of the present disclosure to provide a communication system that is capable of performing the low speed communication and the high speed communication properly without disposing an additional circuit for separating a signal in each transceiver when the transceiver for the low speed communication and the transceiver for the high speed communication are connected to the common transmission path via the bus connection.

According to an aspect of the present disclosure, the communication system includes a transmission path and multiple nodes. The transmission path has a pair of communication lines. One of the communication lines is positive and a remaining one of the communication lines is negative. The pair of communication lines are capable of performing a differential communication. The multiple nodes are connected to the transmission path via a bus connection. Each of the multiple nodes has a first communication portion that performs the differential communication via the transmission path.

At least one of the multiple nodes further includes a second communication portion and a control portion. The second communication portion performs the differential communication at a higher speed than the first communication portion. The control portion communicates with another one of the multiple nodes using either the first communication portion or the second communication portion.

When the control portion performs a high speed communication with another one of the multiple nodes via the second communication portion, the control portion shifts the first communication portion included in each of the remaining multiple nodes to a sleep mode by transmitting a sleep command from the first communication portion. Then the control portion starts the high speed communication by the second communication portion.

In the sleep mode, the first communication portion included in each of the remaining multiple nodes suspends an operation until a potential difference between the pair of communication lines becomes greater than a recessive threshold value. With this configuration, when shifting to the sleep mode, the first communication portion included in each of the remaining multiple nodes does not start the communication until the potential difference between the pair of communication lines becomes greater than a recessive threshold value.

When the control portion completes the high speed communication, the control portion shifts the first communication portion included in each of the remaining multiple nodes from the sleep mode to a normal mode by transmitting a wake-up command from the first communication portion. In the normal mode, the first communication portion included in each of the remaining multiple nodes is capable of performing the differential communication.

The second communication portion performs the high speed communication using a differential signal. In the differential signal, a maximum of the potential difference between the pair of communication lines is equal to or less than the recessive threshold value. A minimum of the potential difference between the pair of communication lines is a negative voltage value that has a polarity opposite to the recessive threshold value of the first communication portion.

The above-described communication system is capable of performing the low speed communication and the high speed communication properly without disposing an additional circuit for separating a signal in each transceiver when the transceiver for the low speed communication and the transceiver for the high speed communication are connected to the common transmission path via the bus connection.

BRIEF DESCRIPTION OF DRAWINGS

The above and other objects, features and advantages of the present invention will become more apparent from the following detailed description made with reference to the accompanying drawings. In the drawings.

DETAILED DESCRIPTION

Hereinafter, an embodiment of the present disclosure will be described with reference to the drawings.

The present disclosure should not be restricted to the embodiment below. Embodiments of the present disclosure may include embodiments that omit a part of a configuration under a condition that the embodiment is capable of solving the difficulties. Embodiments of the present disclosure may include any kind of embodiments without departing from the scope of the essence that is specified by the description in claims.

Figure 1:
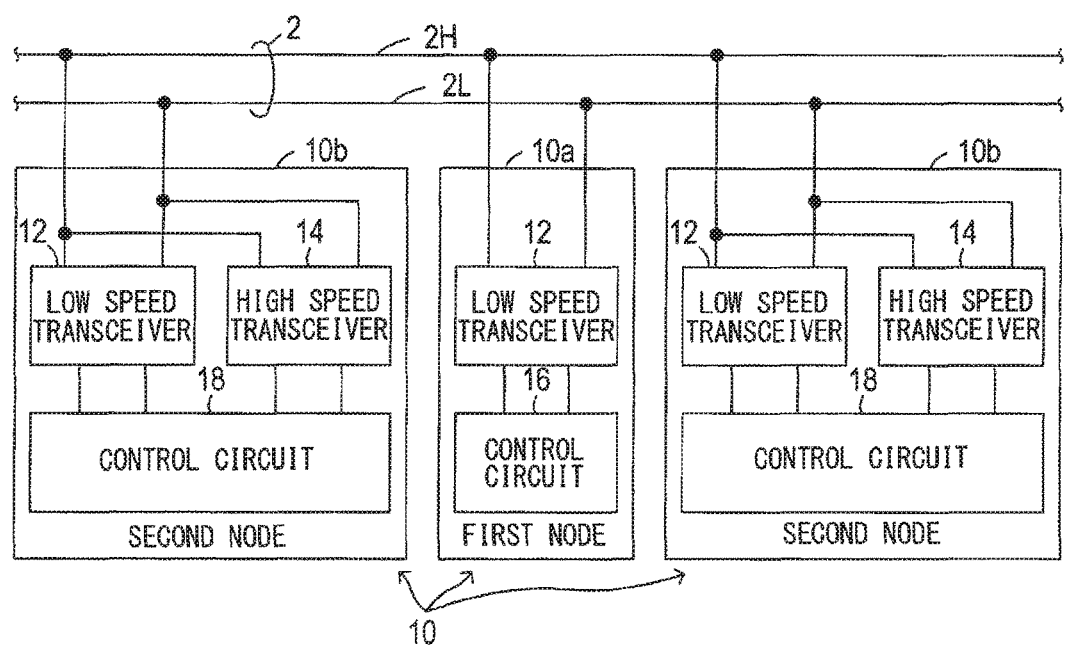
FIG. 1 is a block diagram showing a configuration of an entire communication system according to an embodiment of the present disclosure.

A communication system according to the present embodiment is employed for constructing an in-vehicle network that connects various kinds of in-vehicle apparatuses, such as ECUs for vehicle control, which are capable of communicating with one another. As shown in FIG. 1, the communication system includes a transmission path 2 and multiple nodes 10 connected to the transmission path 2 via a bus connection.

The transmission path 2 includes a pair of communication lines 2H and 2L, which are positive and negative. The transmission path 2 transmits a differential signal transmitted from each of the nodes 10 through the communication lines 2H and 2L.

Each of the multiple nodes 10 performs the differential communication with another node 10 through the transmission path 2. Each of various kinds of in-vehicle apparatuses that configure the in-vehicle network has the node 10.

There are two kinds of nodes 10, which are a first node 10a for the low speed communication and a second node 10b that is capable of performing both the low speed communication and the high speed communication.

The first node 10a for the low speed communication includes a low speed transceiver (LOW SPEED TR) 12 and a control circuit 16. The low speed transceiver 12 constructs CAN or CAN-FD through the transmission path 2. The control circuit 16 performs the differential communication (low speed communication) between the first node 10a and another node 10 (10a or 10b) through the low speed transceiver 12.

The second node 10b for the high speed communication includes the low speed transceiver 12, a high speed transceiver (HIGH SPEED TR) 14, and a control circuit 18. The low speed transceiver 12 of the second node 10b is same as the low speed transceiver 12 of the first node 10a. The high speed transceiver 14 performs a differential communication (high speed communication) having a communication speed higher than the low speed transceiver 12.

The control circuit 18 may be configured by a microcomputer for communication control. The control circuit 18 transmits and receives data (performs high speed communication or low speed communication) using the low speed transceiver 12 and the high speed transceiver 14. The control circuit 18 functions as a control portion.

When the control circuit 18 starts transmitting the data by the high speed transceiver 14, the control circuit 18 switches the low speed transceiver 12 of another node 10 (10a or 10b) to a sleep mode and then starts the high speed communication (transmission). A detail of this operation will be described below.

Figure 2:
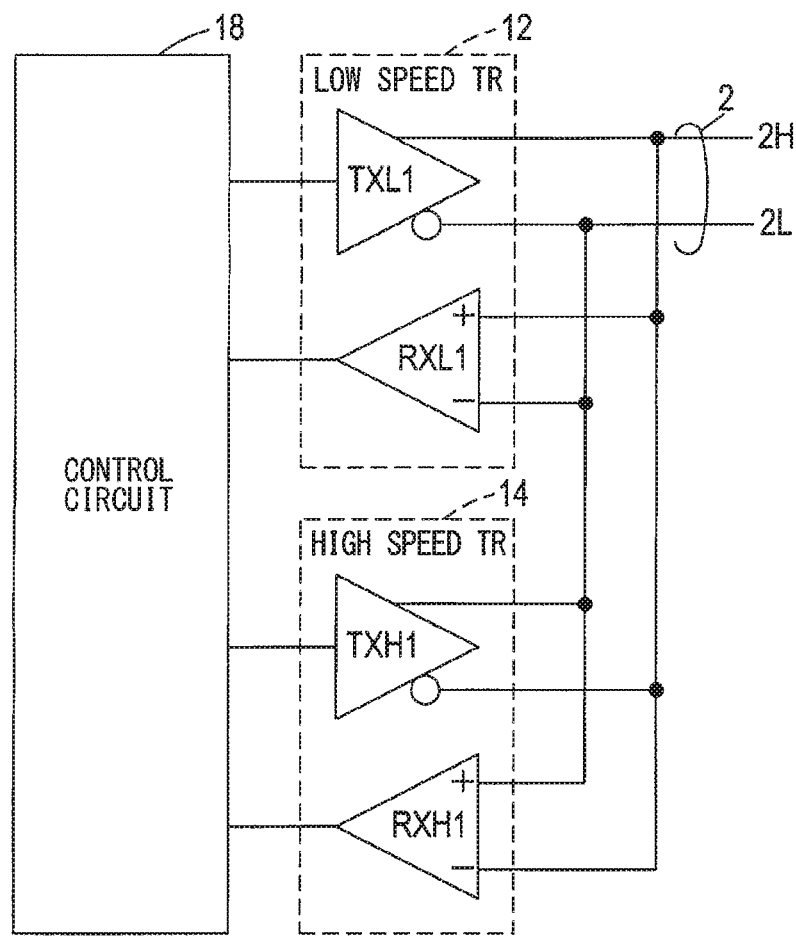
FIG. 2 is a block diagram showing a configuration of a second node that is capable of performing high speed communication.

As shown in FIG. 2, the low speed transceiver 12 is provided by a driver TXL1 and a receiver RXL1 each of which is arranged for the differential communication (low speed communication). The configuration is same as a publicly known transceiver for CAN or CAN-FD.

The high speed transceiver 14 is also provided by the driver TXH1 and the receiver RXH1 each of which is arranged for the differential communication (high speed communication).

Each of the driver TXH1 and the receiver RXH1 of the high speed transceiver 14 is connected to the two communication lines 2H and 2L. Each of the driver TXL1 and the receiver RXL1 of the low speed transceiver 12 is connected to the two communication lines 2H and 2L. Polarities of TXH1 connected to the two communication lines 2H and 2L are opposite to polarities of TXL1 connected to the two communication lines 2H and 2L. Polarities of RXH1 connected to the two communication lines 2H and 2L are opposite to polarities of RXL1 connected to the two communication lines 2H and 2L.

The above-described configuration can prevent the low speed transceiver 12 from starting a communication operation by an erroneous detection of the low speed communication under the high speed communication of the high speed transceiver 14. The erroneous detection is caused by change of a potential difference between the communication lines 2H and 2L.

Hereinafter, the above-described configuration will be described.

Figure 3A:
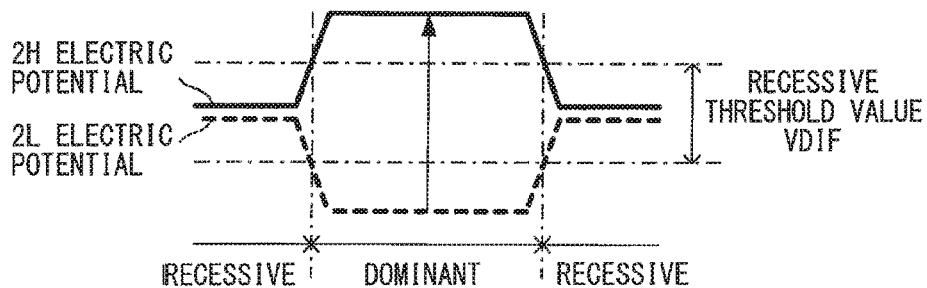
FIG. 3A is a diagram showing a communication operation of a low speed transceiver.

As shown in FIG. 3A, suppose that an electric potential of the communication line 2H is higher than an electric potential of the communication line 2L, and the potential difference is greater than a recessive threshold value VDIF. In this case, the low speed transceiver 12 determines that the transmission path 2 is dominant. Suppose that the potential difference is equal to or less than the recessive threshold value VDIF. In this case, the low speed transceiver 12 determines that the transmission path 2 is recessive.

The low speed transceiver 12 is capable of shifting an operation mode from a normal mode to the sleep mode (that is, a low power mode). In the normal mode, the data is capable of being transmitted and received. The sleep mode suspends transmitting and receiving the date. In the sleep mode, output of the low speed transceiver 12 is high impedance.

During the sleep mode of the low speed transceiver 12, suppose that the potential difference between the communication lines 2H and 2L exceeds the recessive threshold value VDIF by a wake-up command or the like, which is transmitted from another node 10. In this case, the low speed transceiver 12 returns to the normal mode.

During the sleep mode of the low speed transceiver 12, suppose that the potential difference between the communication lines 2H and 2L does not exceed the recessive threshold value VDIF. In this case, the low speed transceiver 12 keeps the sleep mode and suspends the communication operation.

In order to perform the high speed communication by the high speed transceiver 14 without being affected by the communication of the low speed transceiver 12, the low speed transceiver 12 needs to keep the sleep mode and the potential difference between the communication lines 2H and 2L needs to be controlled within the recessive threshold value VDIF.

Figure 3B:
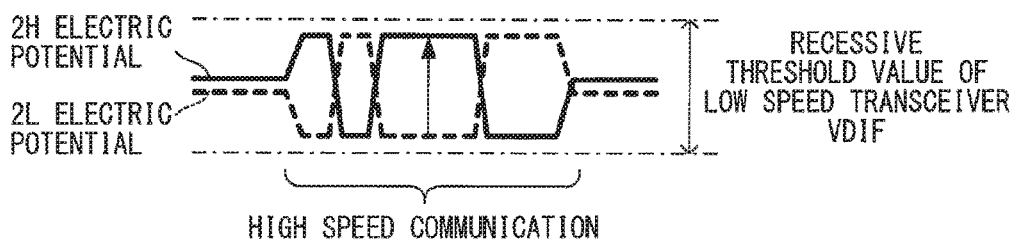
FIG. 3B is a diagram showing a communication operation of a high speed transceiver.

When performing the high speed communication by controlling the potential difference between the communication lines 2H and 2L within the recessive threshold value VDIF, as shown in FIG. 3B, amplitude of the differential signal output from the high speed transceiver 14 may be limited within the recessive threshold value VDIF.

In the high speed communication, when the differential signal is limited within the recessive threshold value VDIF, the high speed communication is incapable of being performed steadily since tolerance for noise degrades.

Figure 3C:
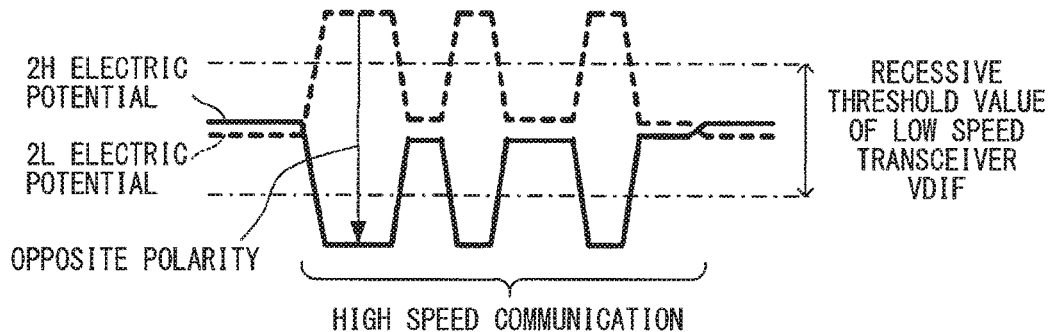
FIG. 3C is a diagram showing a communication operation according to an embodiment of the present disclosure.

In the present embodiment, the high speed transceiver 14 is connected to the transmission path 2 and has a polarity opposite to the low speed transceiver 12. As shown in FIG. 3C, polarities of the electric potentials of the communication line 2H and 2L under the high speed communication by the high speed transceiver 14 are opposite to the polarities of the electric potentials of the communication line 2H and 2L under the low speed communication.

The potential difference between the communication lines 2H and 2L is defined by the differential signal output from the high speed transceiver 14. With the above-described configuration, under the high speed communication by the high speed transceiver 14, the potential difference between the communication lines 2H and 2L does not exceed the recessive threshold value VDIF of the low speed transceiver 12.

Suppose that the recessive threshold value VDIF is a positive voltage. In this case, a minimum potential difference between the communication lines 2H and 2L under the high speed communication is a negative voltage value, which has the different polarity from the recessive threshold value VDIF.

With the above-described configuration, under the high speed communication of the high speed transceiver 14, the low speed transceiver 12 can be prevented from starting the low speed communication. In addition, the high speed communication can be performed by the differential signal that has greater amplitude than the recessive threshold value VDIF of the low speed communication.

When the high speed transceiver 14 does not perform the high speed communication (under suspension of the communication operation), output of the high speed transceiver 14 becomes high impedance. With this configuration, the high speed transceiver 14 does not affect the low speed communication performed by the low speed transceiver 12.

Figure 4:
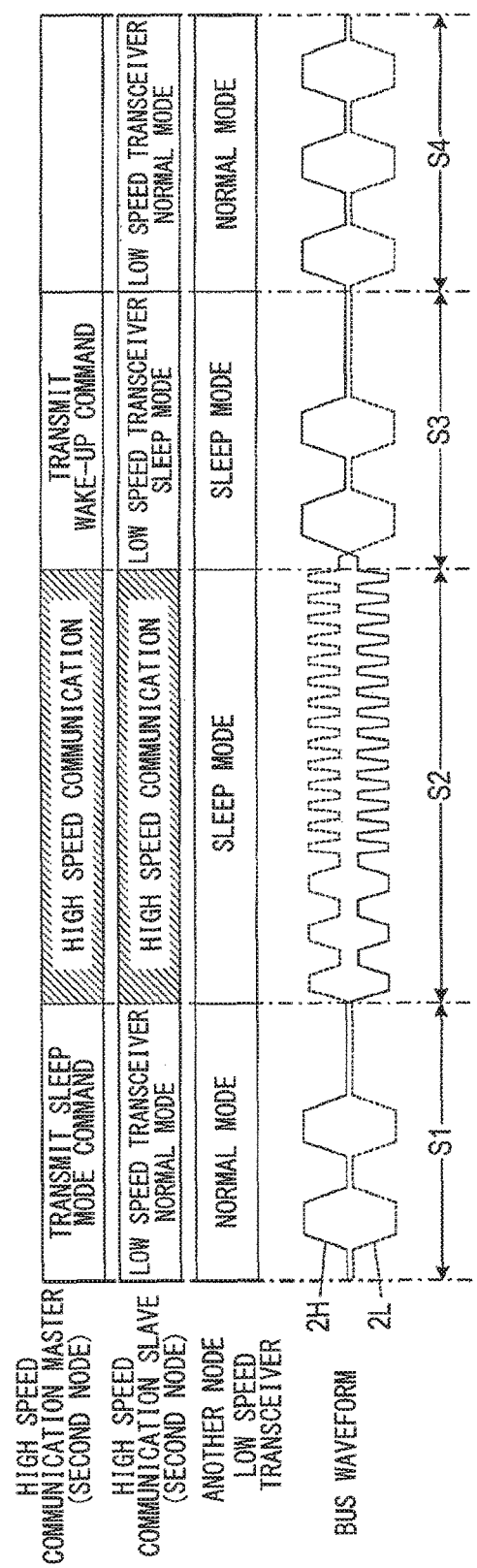
FIG. 4 is a diagram showing a control operation of a control circuit and a change in an electric potential of a transmission path.

In the present embodiment, the control circuit 18 switches between the low speed communication and the high speed communication in a procedure shown in FIG. 4. With this configuration, the low speed communication and the high speed communication can be properly operated using the common transmission path 2 without affecting one another.

The control circuit 18 regards the own node (second node 10b) as the high speed communication master. When starting the high speed communication by the high speed transceiver 14, the control circuit 18 controls the low speed transceiver 12 to transmit a sleep mode command in S1 (S represents a procedure).

When performing the low speed communication through the low speed transceiver 12, the control circuit 18 sets the output of the high speed transceiver 14 to high impedance.

The sleep mode command is transmitted to the low speed transceivers 12 of all of the remaining nodes (10a and 10b) connected to the transmission path 2. Each of the low speed transceivers 12 of all of the remaining nodes switches from the normal mode to the sleep mode.

After switching the low speed transceivers 12 of all of the remaining nodes 10, the control circuit 18 also suspends the communication operation of the own low speed transceiver 12. With this configuration, the own low speed transceiver 12 becomes high impedance and the high speed transceiver 14 starts the high speed communication (S2).

Data transmission and reception under the high speed communication with the high speed transceiver 14 of the other second node 10b, which functions as a high speed communication slave, may be finished. In this case, the control circuit 18 suspends the communication operation of the high speed transceiver 14, sets the output of the high speed transceiver 14 to high impedance, and then shifts to S3.

After the high speed communication is finished, the control circuit 18 of the other second node 10b, which functions as the high speed communication slave, also suspends the communication operation of the high speed transceiver 14, and then the output becomes high impedance.

In S3, the control circuit 18 controls the low speed transceiver 12 to send the wake-up command. With this configuration, each of the low speed transceivers 12 of all of the remaining nodes 10 (10a and 10b) connected to the transmission path 2 shifts from the sleep mode to the normal mode. Then, each of the low speed transceivers 12 connected to the transmission path 2 is capable of performing the normal low speed communication (S4).

As described above, the control circuit 18 of the second node 10b may function as the high speed communication master and start the high speed communication. In this case, the control circuit 18 shifts each of the low speed transceivers 12 of all of the remaining nodes 10 to the sleep mode by sending the sleep mode command from the own low speed transceiver 12, and then starts the high speed communication.

The high speed transceiver 14 that has the polarity opposite to the low speed transceiver 12 is connected to the transmission path 2. With this configuration, under the high speed communication of the high speed transceiver 14, each of the low speed transceivers 12 of all of the remaining nodes 10 does not return to the normal mode and does not start the low speed communication.

The control circuit 18 of the second node 10b that functions as the high speed communication master and the control circuit 18 of another second node 10b that functions as the high speed communication slave can perform the high speed communication through the respective high speed transceivers 14 without affecting the low speed communication.

With the communication system according to the present embodiment, the low speed communication and the high speed communication can be properly performed by using the low speed transceiver 12 and the high speed transceiver 14, respectively, both of which are connected to the transmission path 2 of the differential communication.

The communication system according to the present embodiment can be easily constructed by connecting the multiple second nodes 10b, via a bus connection, to the existing transmission path 2 to which the first node 10a is connected via the bus connection. The first node 10a includes the low speed transceiver 12 for CAN or CAN-FD, and each of the multiple second nodes 10b includes the high speed transceiver 14.

In the communication system according to the present embodiment, the high speed transceiver 14, which is different from the low speed transceiver 12 in a communication speed but has a same configuration as the low speed transceiver 12, is connected to the transmission path 2 with the polarity opposite to the polarity of the low speed transceiver 12. Thus, the communication system can be constructed at extremely low cost.

With the communication system according to the present disclosure, under the high speed communication of a second communication portion which includes the high speed transceiver 14, a first communication portion of another node which includes the low speed transceiver 12 is set to the sleep mode. In addition, the potential difference between the pair of the communication lines that configure the transmission path is limited within a recessive threshold value of the first communication portion. With this configuration, under the high speed communication of the second communication portion, the first communication portion does not return to the normal mode and does not start the low speed communication.

A minimum value of the differential signal that is employed for the high speed communication by the second communication portion is a negative voltage that has the polarity opposite to the recessive threshold value of the first communication portion. Thus, amplitude of the differential signal under the high speed communication is not limited within the recessive threshold value of the first communication portion.

With the above-described configuration, under the high speed communication, the tolerance for noise in the high speed communication does not degrade with the amplitude of the different signal limited. Thus, the high speed communication can be performed with high accuracy.

Suppose that the node that includes the second communication portion does not perform the high speed communication using the second communication portion. In this case, since each of the first communication portions that has been switched to the sleep mode under the high speed communication returns to the normal mode, the low speed communication is properly performed by the first communication portion.

With the communication system according to the present disclosure, the first communication portion for the low speed communication and the second communication portion for the high speed communication can be connected to the common transmission path via the bus connection. The low speed communication and the high speed communication are properly performed without adding, to each communication portion, a complicated circuit for separating signals having different communication speeds.

With the present disclosure, the low speed differential communication for CAN or CAN-FD and the high speed differential communication that has improved tolerance for noise can be performed on the same transmission path. With this configuration, the communication system can be achieved at low cost.

The embodiment of the present disclosure has been described above. The present disclosure should not be limited to the above embodiment and may be implemented in various other embodiments without departing from the scope of the present disclosure.

For example, in the above-described embodiment, the high speed transceiver 14 that has the polarity opposite to the low speed transceiver 12 is connected to the communication lines 2H and 2L that configure the transmission path 2. Alternatively, the configuration to achieve the present disclosure is not limited to the above-described configuration.

That is, execution conditions of the high speed communication according to the present disclosure can be represented by the following relations (1) to (3).

$$V2H-V2L<VDIF \quad (1)$$

$$VRH>VAVH \quad (2)$$

$$VRL<VAVL \quad (3)$$

In the relation (1), V2H represents an electric potential of the communication line 2H, which functions as a positive electrode under the low speed communication, and V2L represents an electric potential of the communication line 2L, which functions as a negative electrode under the low speed communication. In the relation (1), the potential difference between the communication lines 2H and 2L under the high speed communication (V2H-V2L) is equal to or less than the recessive threshold value VDIF of the low speed communication.

Figure 5:
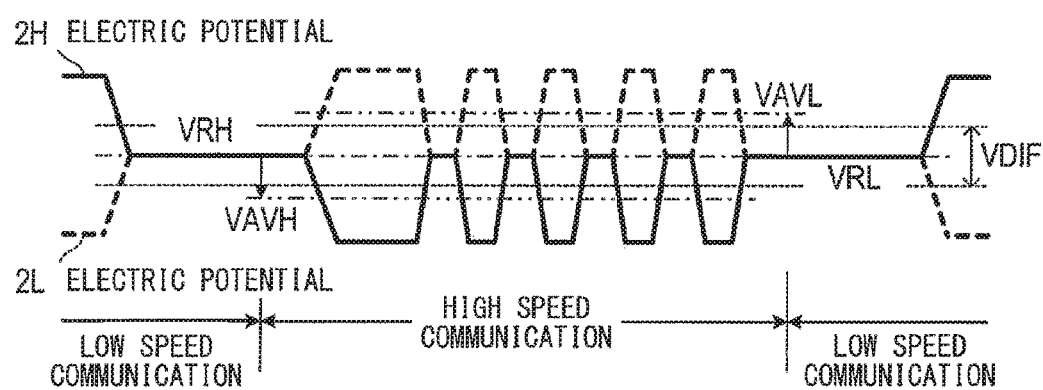
FIG. 5 is a diagram showing differential signals flowing through the transmission path under a low speed communication and under a high speed communication.

As shown in FIG. 5, VRH in the relation (2) represents a recessive electric potential of the communication line 2H under the low speed communication, and VAVH in the relation (2) represents an average electric potential of a maximum and a minimum of the amplitude of the communication line 2H under the high speed communication.

VRL in the relation (3) represents a recessive electric potential of the communication line 2L under the low speed communication, VAVL in the relation (3) represents an average electric potential of a maximum and a minimum of the amplitude of the communication line 2L under the high speed communication.

The second node 10b may be designed to satisfy the relations (1) to (3) that function as the execution conditions of the high speed communication. In this case, the potential difference between the communication lines 2H and 2L can be prevented from exceeding the recessive threshold value of the low speed communication, and the amplitude of the differential signal of the high speed communication can be set greater than the recessive threshold value VDIF.

Figure 6:
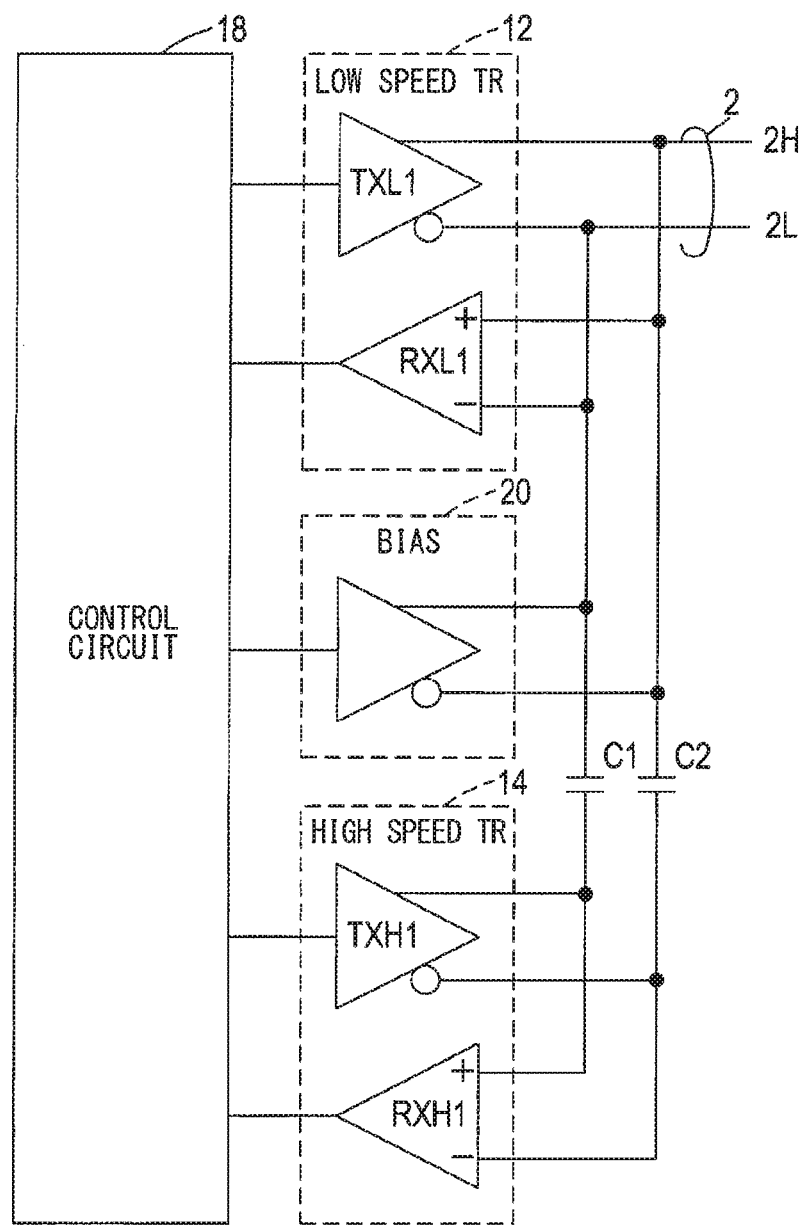
FIG. 6 is a block diagram showing a configuration of a second node according to a first modification of the present disclosure.
Figure 7:
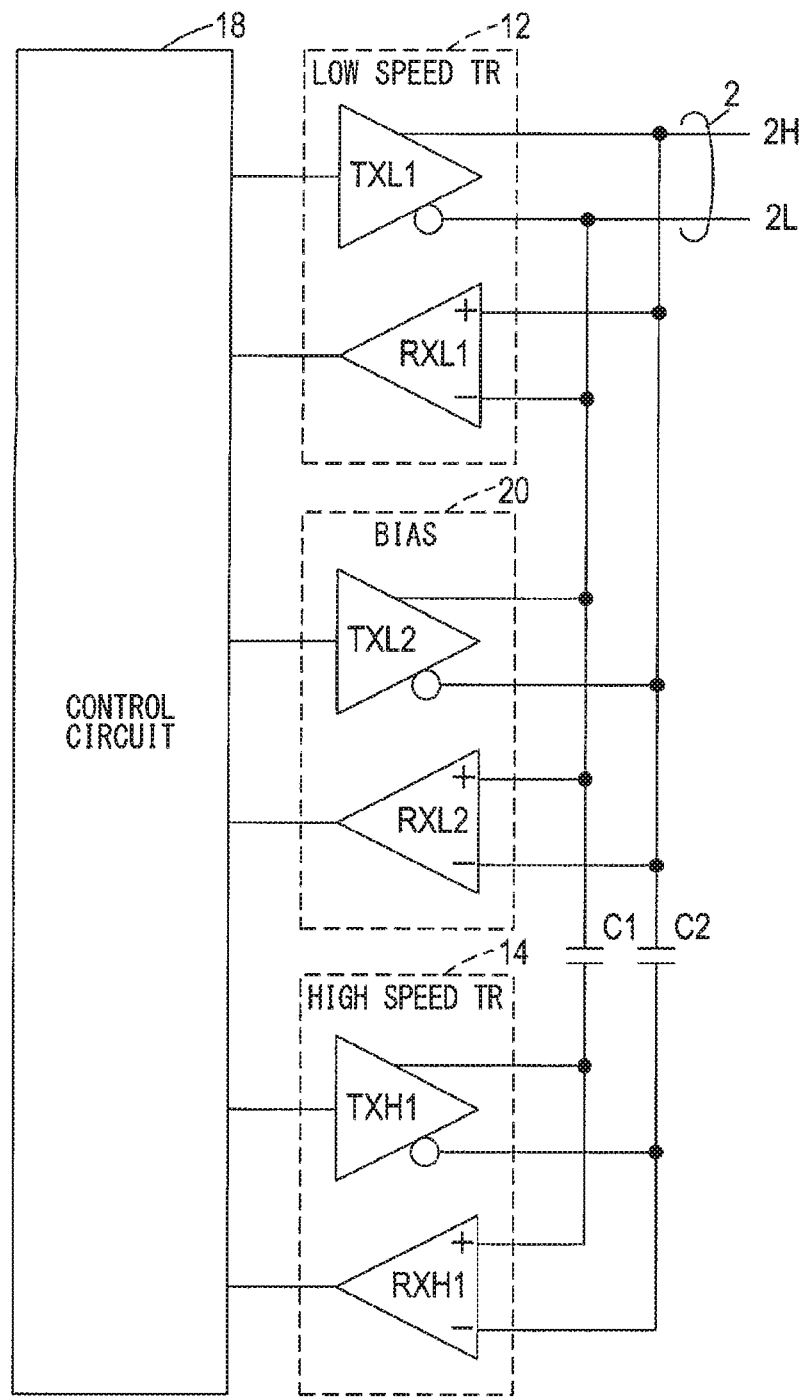
FIG. 7 is a block diagram showing a configuration of a second node according to a second modification of the present disclosure.
Figure 8:
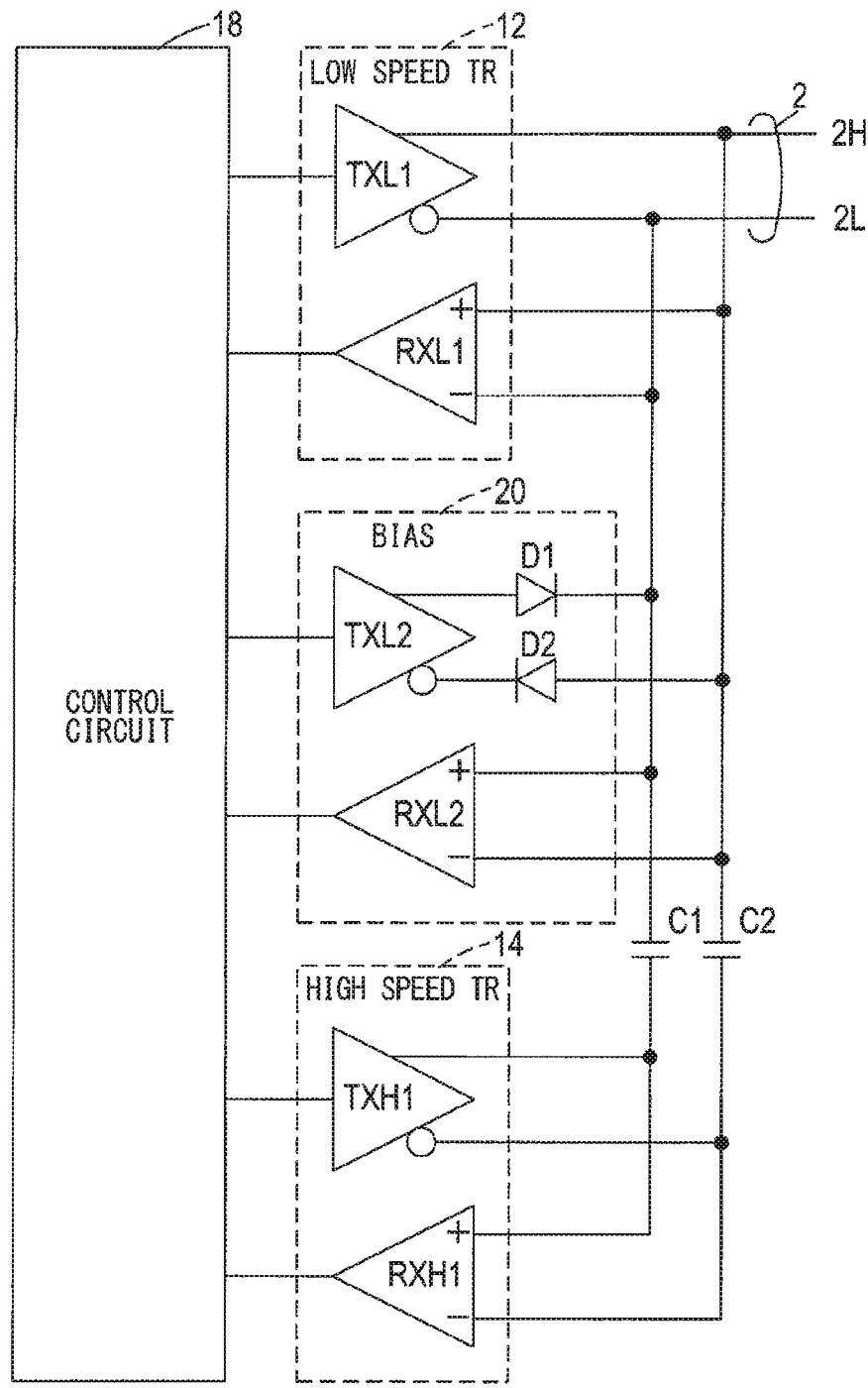
FIG. 8 is a block diagram showing a configuration of a second node according to a third modification of the present disclosure.

With above-described configuration, as shown in first to third modifications of FIGS. 6 to 8, respectively, the second node 10b may be provided with a bias circuit (BIAS) 20 for applying a bias voltage which has the polarity opposite to the recessive threshold value VDIF, between the communication lines 2H and 2L.

A bias circuit 20 according to the first modification shown in FIG. 6 functions as an output circuit which outputs electric current that adjusts the potential difference between the communication lines 2H and 2L to have the polarity opposite to the polarity under the low speed communication. A negative terminal of the bias circuit 20 is connected to the communication line 2H, and a positive terminal of the bias circuit 20 is connected to the communication line 2L.

The bias circuit 20 outputs the electric current to the communication lines 2H and 2L. This output adjusts the electric potential of the communication line 2H to the average electric potential VAVH, and adjusts the electric potential of the communication line 2L to the average electric potential VAVL. When the bias circuit 20 outputs a voltage to the communication lines 2H and 2L, a resistance that has a predetermined output impedance to provide equivalent output of the electric current may be employed.

In the second node 10b shown in FIG. 6, a transmission terminal and a reception terminal of the high speed transceiver 14 are coupled to the transmission path 2 (communication lines 2H and 2L) in an AC coupling manner through filter elements (capacitors C1 and C2 in the figures). Each of the filter elements blocks a direct current signal and allows a high frequency communication signal to pass.

The control circuit 18 deactivates the bias circuit 20 in a state other than the high speed communication. When the high speed communication using the high speed transceiver 14 that functions as the high speed communication master is performed, the control circuit 18 operates the bias circuit 20 by setting the output of the bias circuit to high impedance.

As described above, when the second node 10b of the first modification shown in FIG. 6 constructs the in-vehicle network, advantages similar to the above-described embodiment can be provided.

A bias circuit 20 of the second modification shown in FIG. 7 is provided by a low speed transceiver that includes a driver TXL2 and a receiver RXL2 for the differential communication (low speed communication) similar to the low speed transceiver 12. The low speed transceiver that configures the bias circuit 20 is connected to the communication lines 2H and 2L with polarities opposite to the polarities of the low speed transceiver 12 for the low speed communication.

In a second node 10b shown in FIG. 7, a transmission terminal and a reception terminal of the high speed transceiver 14 are coupled to the transmission path 2 (communication lines 2H and 2L) in the AC coupling manner. The control circuit 18 applies a bias voltage to the communication lines 2H and 2L through the driver TXL2 under the high speed communication.

The second node 10b of the second modification shown in FIG. 7 can provide advantages similar to the first modification. In addition, since the low speed transceiver can be employed as the bias circuit 20, the second node 10b of the second modification can be achieved at low cost in comparison with the first modification.

In a bias circuit 20 of the third modification shown in FIG. 8, diodes D1 and D2 are added to the bias circuit 20 shown in FIG. 7. The diode D1 is arranged between a positive output terminal of the driver TXL2 and the communication line. The diode D2 is arranged between a negative output terminal of the driver TXL2 and the communication line. A forward direction of each of the diodes D1 and D2 is defined as the direction of the applied bias current.

Each of the diodes D1 and D2 is employed for adjusting the potential difference (in other words, bias voltage) between the communication lines 2H and 2L using a voltage drop (in this case, approximately 0.7V) which occurs when each of the diodes D1 and D2 turns on.

Suppose that a transceiver for the differential communication may be applied to the bias circuit 20. In this case, the driver TXL2 of the transceiver is capable of generating the potential difference between the communication lines 2H and 2L to have the polarity opposite to the polarity under the low speed communication. The driver TXL2 of the transceiver may fail to generate the potential difference suitable for the high speed communication.

The third modification shown in FIG. 8 can adjust the potential difference between the communication lines 2H and 2L using the diodes D1 and D2.

The second node 10b of the third modification shown in FIG. 8 can properly adjust the bias voltage that is applied between the communication lines 2H and 2L under the high speed communication in comparison with the second modification. The second node 10b of the third modification can more properly perform the high speed communication than the second node 10b of the second modification.

In FIG. 8, voltage adjustment is performed using the forward direction voltage drop of the diodes D1 and D2. Alternatively, resistor can replace the diode as a voltage adjustment element. Alternatively, the diode and the resistor can be combined as the voltage adjustment element.

In each bias circuit 20 of the second modification shown in FIG. 7 and the third modification shown in FIG. 8, the receiver RXL2 is disposed since the low speed transceiver is employed. Actually, the receiver RXL2 is not needed and may be omitted.

In the first to third modifications shown in FIGS. 6 to 8, when the bias circuit 20 is disposed, the high speed transceiver 14 is coupled to each of the communication lines 2H and 2L in the AC coupling manner. Thus, each of the communication lines 2H and 2L may be connected to have the polarity opposite to the polarity shown in figures (in other words, the same polarity as the low speed transceiver 12).

The invention claimed is:

1. A communication system comprising:
   a transmission path that has a pair of communication lines, one of the communication lines being positive and a remaining one of the communication lines being negative, and the pair of communication lines being capable of performing a differential communication; and
   a plurality of nodes connected to the transmission path via a bus connection, and each of the plurality of nodes having a first communication portion that performs the differential communication via the transmission path, wherein
   at least one of the plurality of nodes further includes:
      a second communication portion that performs the differential communication at a higher speed than the first communication portion; and
      a control portion that communicates with another one of the plurality of nodes using either the first communication portion or the second communication portion,
   when the control portion performs a high speed communication with another one of the plurality of nodes via the second communication portion,
   the control portion:
      shifts the first communication portion included in each of the remaining plurality of nodes to a sleep mode by transmitting a sleep command from the first communication portion, wherein, in the sleep mode, the first communication portion included in each of the remaining plurality of nodes suspends an operation until a potential difference between the pair of communication lines becomes greater than a recessive threshold value; and
      then starts the high speed communication by the second communication portion,
   when the control portion completes the high speed communication, the control portion shifts the first communication portion included in each of the remaining plurality of nodes from the sleep mode to a normal mode by transmitting a wake-up command from the first communication portion,
   in the normal mode, the first communication portion included in each of the remaining plurality of nodes is capable of performing the differential communication,
   the second communication portion performs the high speed communication using a differential signal, and
   in the differential signal, a maximum of the potential difference between the pair of communication lines is equal to or less than the recessive threshold value, and a minimum of the potential difference between the pair of communication lines is a negative voltage value that has a polarity opposite to the recessive threshold value of the first communication portion.

2. The communication system according to claim 1, wherein
   the second communication portion includes a high speed transceiver, the first communication portion includes a low speed transceiver, and a transmission terminal and a reception terminal of the high speed transceiver are connected to the pair of communication lines of the transmission path with polarities opposite to polarities of a transmission terminal and a reception terminal of the low speed transceiver.

3. The communication system according to claim 1, wherein
   at least one of the plurality of nodes that includes the first communication portion, the second communication portion, and the control portion further includes a bias circuit that applies a bias voltage to the pair of communication lines, and a polarity of the bias voltage is opposite to a polarity of the recessive threshold value of the first communication portion,
   the second communication portion includes a high speed transceiver,
   the high speed transceiver includes a transmission terminal and a reception terminal each of which is connected to the pair of communication lines via a filter element,
   the filter element blocks a direct current signal and allows a high frequency communication signal, and
   the control portion applies the bias voltage between the pair of communication lines with the bias circuit when the control portion performs the high speed communication with another one of the plurality of nodes via the second communication portion.

4. The communication system according to claim 3, wherein
   the bias circuit includes a driver that has a same configuration as a low speed transceiver included in the first communication portion, and
   the driver is connected to the pair of communication lines with a polarity opposite to a polarity of the first communication portion.

5. The communication system according to claim 3, further comprising
   voltage adjustment elements that adjust the bias voltage and disposed between a driver included in the bias circuit and the pair of communication lines.

6. The communication system according to claim 1, wherein
   the second communication portion includes a high speed transceiver, the first communication portion includes a low speed transceiver, a transmission terminal of the high speed transceiver is connected to the pair of communication lines of the transmission path with a polarity opposite to a polarity of a transmission terminal of the low speed transceiver, and
   a reception terminal of the high speed transceiver is connected to the pair of communication lines of the transmission path with a polarity opposite to a polarity of a reception terminal of the low speed transceiver.

* * * * *